… Patented Nov. 17, 1953

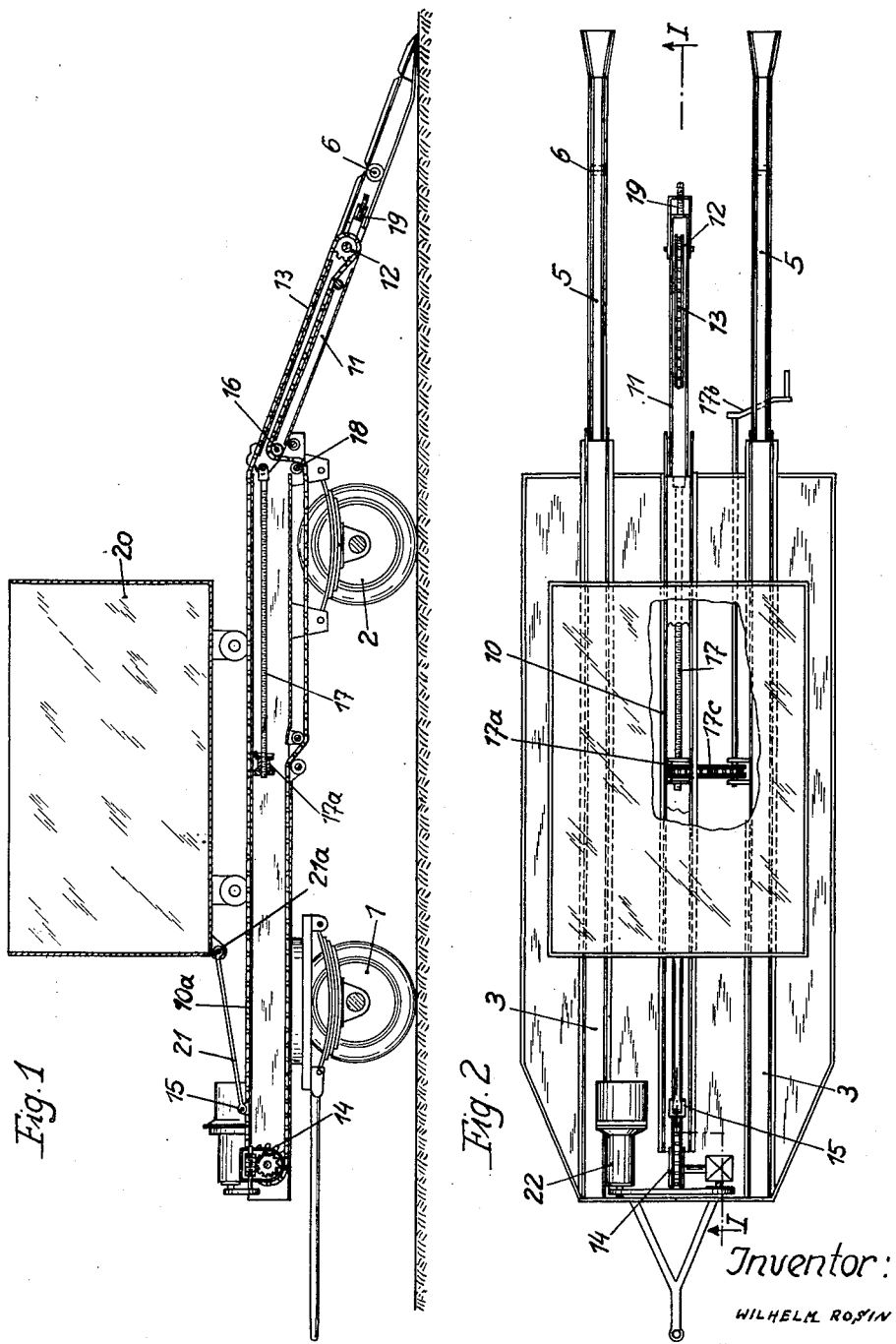

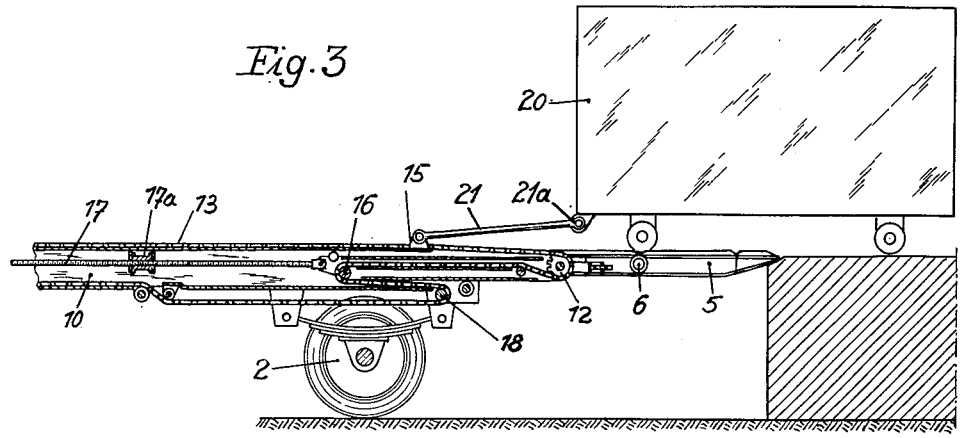
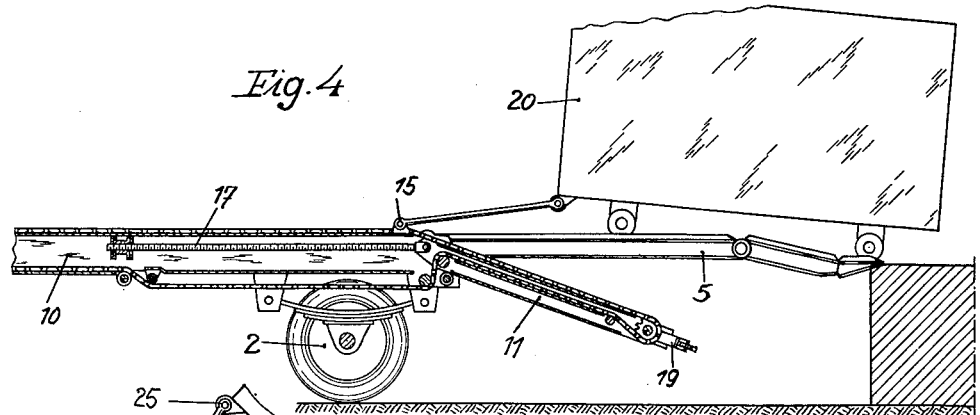
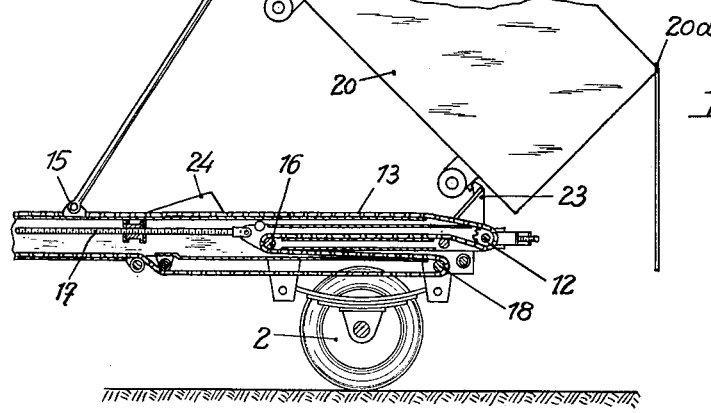

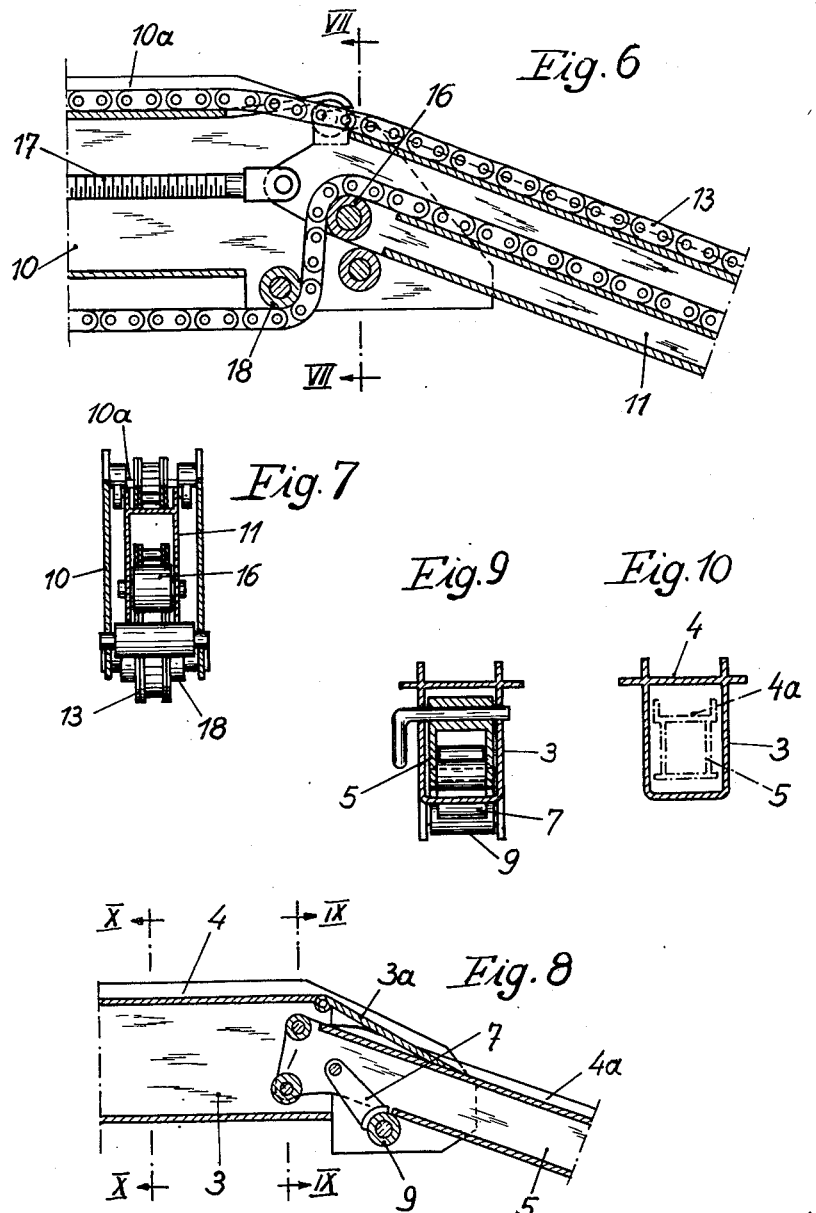

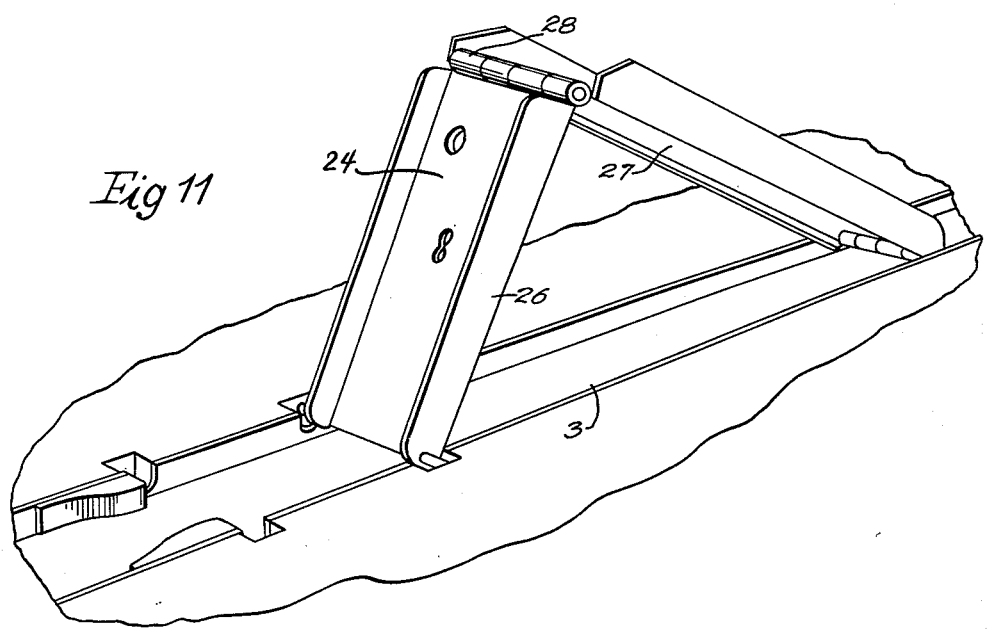
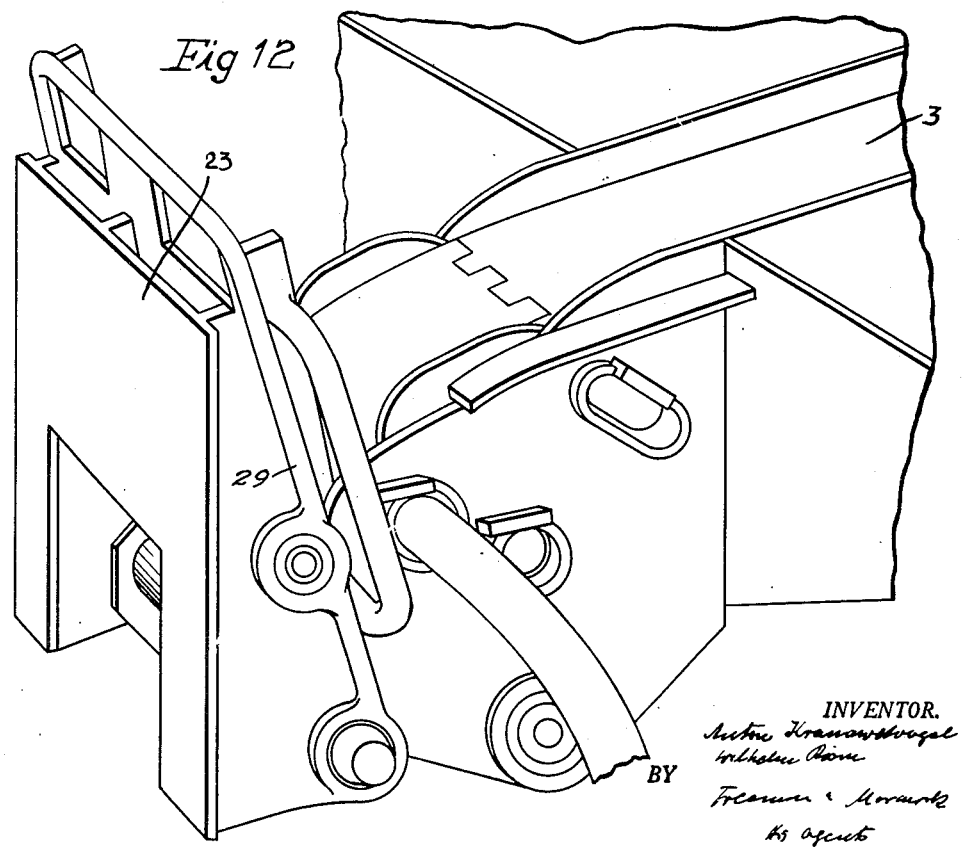

2,659,504

UNITED STATES PATENT OFFICE 2,659,504

MOTOR VEHICLE OR TRAILER FOR TRANSPORTING PORTABLE CASES

Anton Kranawetvogel, Munchen, and Wilhelm Rosin, Bochum, Germany, assignors to Emil H. von Lienen, Fahrzeugfabrik, Bochum, Germany Application January 24, 1951, Serial No. 207,480

Claims priority, application Germany February 8, 1950

3 Claims. (Cl. 214—318)

This invention relates respectively to motor vehicles and trailers, and is particularly concerned with vehicles which are used for transporting portable cases.

The objects of the invention will be better understood and more fully appreciated if there are briefly mentioned the motor vehicles and trailers now familiar to the art for transporting cases which, although portable, mostly are not suitable for road transport, in particular such cases as are loaded with furniture or the like, and are carried by motor vehicle, railway and ship to their destination to be unloaded there. At their rear end the vehicles have a loading bridge which may be swung vertically and across which the cases are drawn on the vehicle by means of a rope winch arranged in the vehicle. If the vehicles are relatively large several cases may be accommodated on them one behind the other. After loading the bridge is swung up and secured to the vehicle. The unloading of the cases is often difficult and involves some danger. Immediately that the wheeled case reaches the loading bridge it runs on owning to its own weight, and must be stopped by special stop blocks. By the stop the case is shaken and its contents may suffer considerable damage. For bringing the cases up to platforms lying higher than the vehicle bottom special means are required which, however, are not available in each case.

The object of the present invention is to obviate these difficulties. To this end, a middle longitudinal girder of the bottom of a vehicle serves as a guide for a driver to be coupled with an eye for the fork-shaped shaft of a case. The driver is inserted in an endless drawing means which is guided over reversing rollers arranged at the front end of the vehicle and over an arm extending at least to a portion of the length of a loading bridge. This arm may be hinged to respectively the bottom of the vehicle and the middle girder. It is of particular advantage to make the middle longitudinal girder in the form of a hollow girder in which the arm can be slid and guided that bears the rear reversing roller for the endless drawing means and to arrange guide rollers or the like at the front end of and above and below said arm so that the drawing means is kept tight when the arm is slid in said drawing means being formed into loops by said rollers.

As the eye for the fork-shaped drawing shaft is connected in a closed system of mechanical forces to the driver which is steered by the drawing means and guided in the longitudinal girder cases can be smoothly drawn up to a vehicle and smoothly pushed down again whether the loading bridge runs downwards, upwards or horizontally according to local conditions. If a case is pushed down from an inclined bridge the movement of the endless drawing means is checked by its driving motor so that the case cannot run on freely under its own weight. The special design of the arm according to the invention is advantageous in that the arm may be accommodated in the vehicle allowing also for the length of the drawing means, so that it is not an obstacle when the vehicle is to be used to transport other goods not requiring the loading bridge. To compensate a change in the length of the drawing means a stretching device is arranged at the end of the arm, which device in addition may be used to fix the arm in any position. Moreover the arm may be provided with a screw spindle serving to slide it in or out. As a drawing means a sprocket chain is especially useful, since such a chain as well as the driver can be reliably mounted and guided in the longitudinal girder and secured there against lifting off. In case a drawing means is not necessary, these parts may be covered with iron sheets for protection.

Moreover the present invention is characterized in that the girders or rails of the loading bridge are also capable of being slid in. They are received in hollow side girders of the vehicle, which are provided on their upper sides with tracks for the wheeled cases. The rails of the bridge are also provided with tracks on their upper sides and, moreover, are so guided at their front ends that the running surfaces of the girders and of the rails unite nearly without a joint. The loading bridge is so shaped and mounted that it is well protected and entirely accommodated in the vehicle frame so as to lie there quite invisible. It therefore requires no space when the vehicle is to be used for other purposes.

A vehicle provided with a device according to the invention may in addition be used when open transport cases, having for instance flap doors and containing goods to be poured out (bulk goods), are to be emptied from the vehicle direct. To this end the inventor suggests providing the guide tracks of the longitudinal side girders of the vehicle with fixable cone-shaped pieces and detachable end stops so that the cases when set in motion are given their tipping position: the cases being pushed back by means of the driver, but being stopped at the other end, the fulcrum between the shaft and the case is urged upwardly, i. e. until the required tipping angle is attained. When, however, the driver is pulled in the opposite direction, the case goes slowly down again to its normal position.

Further objects and advantages of the present invention will be apparent from the following description reference being made to the accompanying drawings wherein a preferred embodiment of the present invention is clearly shown.

Figure 1 is a longitudinal, vertical, cross-sectional view taken on the line I—I of Figure 2;

Figure 2 is a top plan view of a trailer, partly in section;

Figures 3 and 4 are views of the rear part thereof in combination with a stationary platform;

Figure 5 illustrates the tipping of a transport case on a trailer;

Figure 6 illustrates how the end of the arm for the case drawing device is locked in the guide of the vehicle;

Figure 7 is a cross sectional view taken on the line VII—VII of Figure 6;

Figure 8 illustrates how the ends of the rails of the loading bridge are locked in the longitudinal girders of the vehicle;

Figure 9 is a cross sectional view taken on the line IX—IX of Figure 8;

Figure 10 is a cross sectional view taken on the line X—X of Figure 8 with the rail of the loading bridge slid in.

Figs. 11 and 12 are enlarged perspective views of a pair of chocks for use in the lifting of boxes to be emptied on its liquid contents while remaining on the trailer.

The chassis of the trailer shown in the drawing consists of the longitudinal side girders 3 mounted on the wheel sets 1 and 2. As shown in Figure 10 the longitudinal girders have hollow sections and are provided with guides 4 on their upper sides. At the rear end of these girders there is provided a loading bridge the longitudinal rails 5 of which may be slid into the hollow girders 3. The rails 5 have likewise guides 4a on their upper sides. The rails 5 are subdivided in their length, the individual parts being coupled by means of lockable joints 6. As shown in Figure 8 each rail has at its end a supporting lever 7 which is capable of being swung and which, when drawing out the rail, hits against the roller 9 and prevents the rail from being drawn out entirely. At the same time it urges the end of the rail upwardly. Moreover a guide sheet 3a may be provided to serve as a passage. In addition, the roller 9 serves as a support for the rail 5. After loading the trailer the rails 5 are slid throughout their length into the girders 3.

In the middle of the vehicle is provided another longitudinal hollow girder 10 at the rear end of which an arm 11 is slidably guided. This arm extends over a substantial portion of the length of the loading bridge, and may be so mounted that it is capable of being swung vertically. To the free end of the arm is fastened a reversing roller for an endless drawing means 13. This drawing means 13 is laid round the reversing roller 14 mounted at the front end of the vehicle, additional guide rollers being interposed. The drawing means is provided with a driver 15 guided on the upper side of the girder 10 in the guide 10a. The guide may be seen from Figures 6 and 7.

The upper side of the drawing means consisting of a Gall's chain also lies in said guide 10a, whereas the lower side is arranged within the girder 10 i. e. in its front part at least. As may be seen more clearly from Figures 3 and 5, a reversing roller 16 is arranged at the end of the arm 11 that is slid into the girder. The drawing means coming from the reversing roller 12 is laid round the rollers 16 and 18 in two bends so that, when sliding the arm into the girder 10, the length of the drawing means is adjusted. The arm 11 is, moreover, provided at its end with a stretching appliance 19 to compensate a lengthening of the drawing means and to fix, if necessary, the arm in a given position. In addition, a special spindle 17 may be provided for moving the arm. To said spindle is co-ordinated the nut 17a which is turned by means of a crank 17b or an electric motor (not shown in the drawing) through the chain or belt drive 17c, and thus draws the spindle in or urges it out.

To load the vehicle the loading bridge with its rails 5 is taken out and is either supported on the soil, as shown in Figure 1 or laid with its free end on a stationary platform as shown in Figure 3. The transport case 20 has a fork-shaped drawing shaft 21 mounted in an appropriate eye 21a and coupled with the driver 15, e. g. by means of a bolt or the like. The drawing means is set to motion by means of a driving device 22 (which in the case of a saddle-bottomed vehicle may be accommodated towards the front end), whereby the driver is pulled forward in the guide 10a, the guide track for the driver extending to part of the arm 11. Figure 1 shows a vehicle for one case (20) only. For further transportation the case 20 may be keyed, but it remains connected to the driver. With longer vehicles the fork-shaped shaft is uncoupled from the driver 15, which is conveyed back under the vehicle to pull up the next case. At last the arm 11 and the rails 5 of the loading bridge are taken in.

For unloading the loading bridge and the rails are taken out and the driver is moved back so that the case 20 is pushed down from the vehicle. Such movement goes on smoothly even when the loading bridge is inclined.

In transporting cases provided with flap doors and containing liquid goods, which can be emptied from the boxes by pouring without removal from the trailer, a device is used which in detail is illustrated in Figs. 11 and 12.

For this purpose two chocks 23, 24 are provided, which are displacedly located upon each of the girders 3.

The front chock 24 consists of two supporting arms 26, 27 which are rotatably connected with each other by a hinge 28. The end chock 23 is provided with an inclined frame.

In order to empty the liquid contents of a can, which is supported on rollers, the same is first lifted by means of two rollers sliding along the inclined separating arm 26; at the same time the case is upwardly pushed upon frame 29 of chock 24 into an inclined position, thereby enabling the outflow of the liquid contents from the case, while the same is retained upon the girders 3.

In view of the fact that the arm as well as the loading bridge may be slid in, it is easily possible to use the vehicle for transporting different goods. The invention, illustrated in the drawing on the basis of a trailer, also applies to motor vehicles and saddle-bottomed vehicles.

What we claim is:

1. A motor truck particularly for the transport of boxes comprising a wheel supported chassis composed of a longitudinal hollow center girder and two longitudinal hollow lateral chassis girders, a loading and unloading ramp composed of two lateral rails connected to said lateral girders and of a center arm ending short of the ramp length, a roller located within a vertical plane upon the rear end of said arm and a second roller located upon the front end of said chassis, a power driven endless sprocket chain supported on said rollers, said center arm being operatively coupled with said endless chain, said lateral rails and said center arm of the ramp being located for a slidable displacement in the hollow center girder and the lateral chassis girders.

2. A motor truck particularly for the transport of boxes comprising a wheel supported chassis composed of a longitudinal hollow center girder and two longitudinal hollow lateral girders, a loading and unloading ramp composed of two lateral rails pivotally connected to said lateral girders and of a center arm ending short of the ramp length, a roller located within a vertical plane upon the rear end of said arm and a second roller located upon the front end of said chassis, a power driven endless sprocket chain supported on said rollers, said center arm being operatively coupled with said endless chain for a lifting and lowering movement thereof in a vertical plane, and cone-shaped members and end stops spacedly located on said lateral chassis girders, said cone-shaped members and end stops adapted to secure the box during its backward push into a tilting position.

3. A motor truck particularly for the transport of boxes comprising a wheel supported chassis composed of a longitudinal hollow center girder and two longitudinal hollow lateral girders, a loading and unloading ramp composed of two lateral rails pivotally connected to said lateral girders and of a center arm ending short of the ramp length, a roller located within a vertical plane upon the rear end of said arm and a second roller located upon the front end of said chassis, a power driven endless sprocket chain supported on said rollers, said center arm being operatively coupled with said endless chain for a lifting and lowering movement thereof in a vertical plane, cone-shaped members and end stops spacedly located on said lateral chassis girders, said cone-shaped members and end stops adapted to secure the box during its backward push into a tilting position and a rod swingably connected with its one end to said endless chain and adapted to be fastened with its other end to the box.

ANTON KRANAWETVOGEL.
WILHELM ROSIN.

References Cited in the file of this patent

UNITED STATES PATENTS

| Number | Name | Date |
|---|---|---|
| 1,010,297 | Michener, Jr. | Nov. 28, 1911 |
| 2,123,505 | Faries | July 12, 1938 |
| 2,130,117 | Butts | Sept. 13, 1938 |
| 2,317,984 | Fitch | May 4, 1943 |
| 2,339,288 | Norbom | Jan. 18, 1944 |
| 2,512,798 | Hodges | June 27, 1950 |
| 2,516,881 | Jarvis | Aug. 1, 1950 |
| 2,613,827 | Van Doorne | Oct. 14, 1952 |

FOREIGN PATENTS

| Number | Country | Date |
|---|---|---|
| 440,233 | Great Britain | Dec. 23, 1935 |
| 472,467 | Great Britain | Sept. 23, 1937 |
| 50,510 | Netherlands | May 16, 1941 |